(12) United States Patent
Lewis et al.

(10) Patent No.: US 8,358,457 B2
(45) Date of Patent: Jan. 22, 2013

(54) MINIATURE ROTATING TRANSMISSIVE OPTICAL DRUM SCANNER

(75) Inventors: Robert Lewis, Bend, OR (US); Lawrence Parrington, Rexford, NY (US); Michael Rutberg, Wethersfield, CT (US)

(73) Assignee: Honeybee Robotics, Ltd., New York, NY (US)

( * ) Notice: Subject to any disclaimer, the term of this patent is extended or adjusted under 35 U.S.C. 154(b) by 249 days.

(21) Appl. No.: 12/854,035

(22) Filed: Aug. 10, 2010

(65) Prior Publication Data

US 2012/0038962 A1 Feb. 16, 2012

Related U.S. Application Data

(60) Provisional application No. 61/232,715, filed on Aug. 10, 2009.

(51) Int. Cl.
*G02B 26/08* (2006.01)

(52) U.S. Cl. ........... 359/209.1; 359/210.1; 359/210.2; 359/221.2

(58) Field of Classification Search ............ 359/209.1, 359/210.1, 210.2, 211.1, 211.2, 211.5, 221.2, 359/725, 804
See application file for complete search history.

(56) References Cited

U.S. PATENT DOCUMENTS

| 1,884,287 | A  | * | 10/1932 | Schroter ............... 348/201 |
| 6,262,825 | B1 | * | 7/2001  | Mueller et al. ......... 359/196.1 |
| 6,310,710 | B1 | * | 10/2001 | Shahar et al. .......... 359/210.1 |
| 6,624,919 | B2 | * | 9/2003  | Lambert .............. 359/205.1 |
| 6,997,562 | B2 | * | 2/2006  | Cho et al. ............... 353/32 |
| 7,525,567 | B2 | * | 4/2009  | McCutchen ............ 348/46 |

* cited by examiner

*Primary Examiner* — Frank Font
(74) *Attorney, Agent, or Firm* — Leighton K. Chong

(57) ABSTRACT

A miniature rotating transmissive optical scanner system employs a drum of small size having an interior defined by a circumferential wall rotatable on a drum axis, an optical element positioned within the interior of the drum, and a light-transmissive lens aperture provided at an angular position in the circumferential wall of the drum for scanning a light beam to or from the optical element in the drum along a beam azimuth angle as the drum is rotated. The miniature optical drum scanner configuration obtains a wide scanning field-of-view (FOV) and large effective aperture is achieved within a physically small size.

19 Claims, 5 Drawing Sheets

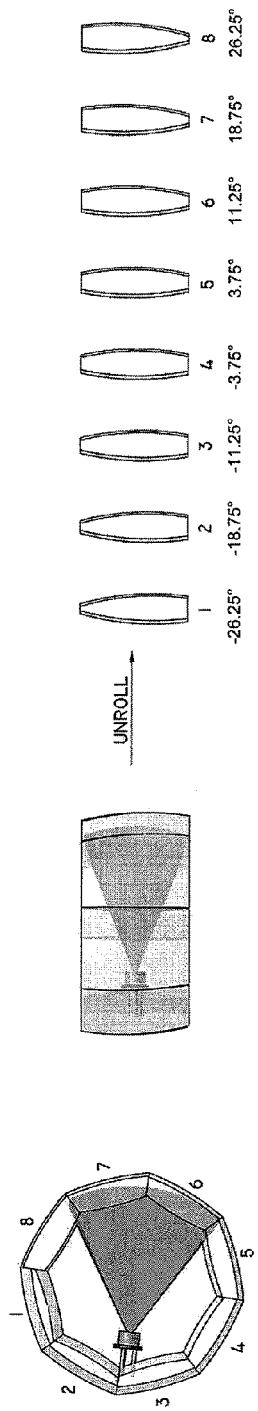
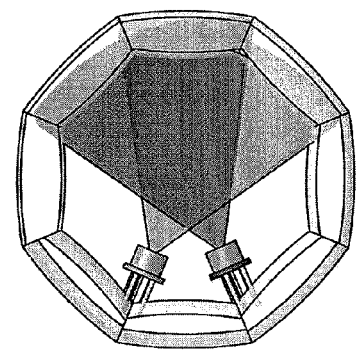
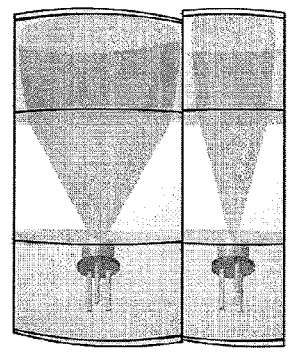
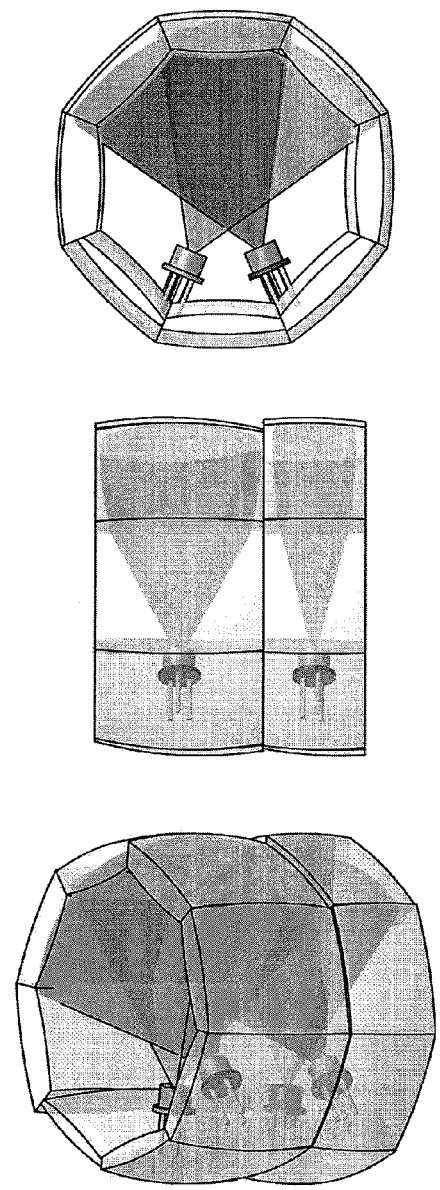
FIG 3
FIG 4A
FIG 4B
FIG 4C

MINIATURE ROTATING TRANSMISSIVE OPTICAL DRUM SCANNER

This U.S. Patent Application claims the priority of U.S. Provisional Application 61/232,715 filed on Aug. 10, 2009.

This invention was made with Government support under U.S. DARPA SBIR Phase 1 award, Contract No. W31P4Q-07-C-0099, NASA SBIR Phase 1 award, Contract No. NNX08CB11P, U.S. Army SBIR Phase 1 award, Contract No. W911QX-09-C-0067, and NASA SBIR Phase 2 award, Contract No. NNX09CB11C. The Government has certain rights in the invention.

TECHNICAL FIELD

The described invention relates to a means of scanning an optical path, such as a laser beam or a photodiode's instantaneous field of view, in azimuth and elevation. In particular, the invention has application in light detection and ranging (LIDAR) systems that require wide field-of-view and large effective aperture for optical remote sensing of scattered light to find range and/or other information of a distant target. LIDAR technology has application in geomatics, archaeology, geography, geology, geomorphology, seismology, forestry, remote sensing and atmospheric physics.

BACKGROUND OF INVENTION

Prior art for optical path scanning includes rotating flat and polygonal mirrors, microelectromechanical systems (MEMS) reflective elements (bistable and continuous-range-of-motion), holographic disc scanners, solid-state beam steering (e.g. acousto-optic and electro-optic materials), and Risley prisms. The use of flat and polygonal mirrors and holographic disc scanners for two-axis scanning creates a "pick-two" situation between wide field-of-view, small package size, and large effective aperture. MEMS reflective elements by definition have very small areas and thus are not suitable for scanning large apertures. Solid state beam steering materials and Risley prisms cannot achieve wide scan angles (typically <10°).

SUMMARY OF INVENTION

In accordance with the present invention, an optical scanner system employs: a drum of small size having an interior defined by a circumferential wall that is rotatable on a drum axis; an optical element positioned within the interior of the drum; a light-transmissive lens aperture provided at one angular position in the circumferential wall of the drum for scanning a light beam to or from the optical element in the interior of the drum along a beam azimuth angle as the drum is rotated; whereby a wide scanning field-of-view (FOV) and large effective aperture is achieved within a physically small size.

The optical element may be a light source or emitter, and the emitted light is collimated as a scanning light beam by the drum lens. Conversely, it may be a light detector, and incident light is collimated as a scanned detection beam by the drum lens. The optical element is axially shifted up and down to provide an elevation scan as the beam elevation angle is scanned up and down.

In preferred embodiments, the drum wall is provided with multiple lenses in a row at incremental angular positions to allow for multiple scans per drum revolution. Respective centers of the lenses may be incrementally axially staggered in elevation offset from each other in order to draw multiple scanlines at different elevations per drum revolution. The drum may have two drum sections axially in parallel with each other, wherein one drum section has an emitter element and the other drum section has a detector element, and the two rows of lenses are axially aligned to effect elevation scanning in lockstep with each other. Two emitter elements may be provided in the emitter drum section positioned at an angle with respect to one another, with only one being turned on at a time.

In preferred manufacturing, the row of lenses of the drum may be implemented as clear plastic Fresnel lenses adhered to the drum wall. A polygonal drum blank may be used with Fresnel lenses adhered to its inner and/or outer surfaces. Alternatively, a cylindrical drum blank is used and thin Fresnel lenses are bent and adhered to the drum wall. In the latter configuration, the Fresnel lenses may be formed as astigmatic flat Fresnel lenses configured to perform without distortion when adhered to the drum wall, or they may be formed as pairs of crossed cylindrical Fresnel elements of which the inner ones focus the light in azimuth and the outer ones focus the light in elevation.

To form Fresnel lenses staggered in elevation offset from each other, the Fresnel lenses may be formed as inner and outer Fresnel lens elements adhered to respective inner and outer concentric cylindrical drum blanks with a collimated light region in between grooved surfaces of paired Fresnel lens elements.

The miniature optical drum scanner system of the invention has wide application in miniature LIDAR systems that require wide field-of-view and large effective aperture.

Other objects, features, and advantages of the present invention will be explained in the following detailed description of the invention having reference to the appended drawings.

BRIEF DESCRIPTION OF DRAWINGS

FIG. 3 illustrates an embodiment having multiple lenses with elevation staggering of lens aspects.

FIGS. 4A, 4B, and 4C show isometric, side, and top views, respectively, of a refractive drum scanner incorporating two lens rows with multiple elevation-staggered lenses each.

DESCRIPTION OF EMBODIMENTS

In the following detailed description of the invention, certain preferred embodiments are illustrated providing certain specific details of their implementation. However, it will be recognized by one skilled in the art that many other variations and modifications may be made given the disclosed principles of the invention.

Figure 1A:
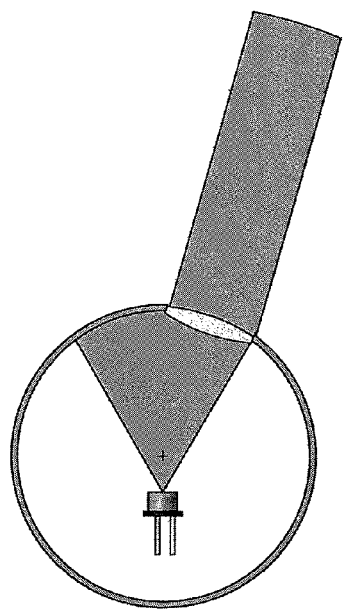
FIGS. 1A and 1B illustrate a basic principle of operation of an optical drum scanner in accordance with the invention.
Figure 1B:
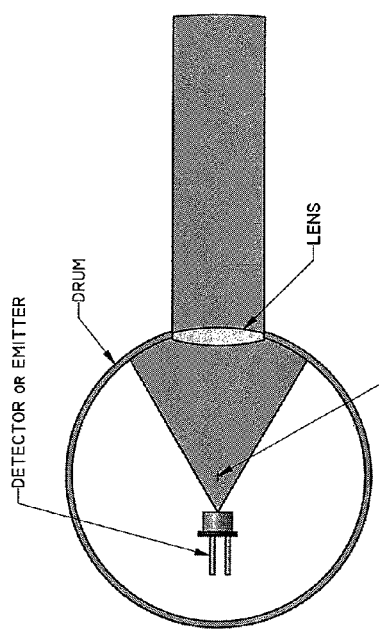

A basic principle of operation of the described invention is illustrated in FIGS. 1A and 1B. In FIG. 1A, an optical scanner system is shown (top view) having a drum with an opaque circumferential wall and a lens aperture provided in the drum wall for scanning a light beam to or from a detector or emitter element. As shown in FIG. 1B, the beam azimuth angle is scanned as the drum rotates. The opaque drum holds a single lens. For a light source or emitter located within the drum, the emitted light is collimated by the drum lens. As the drum rotates on its axis, the azimuth angle of the emitted light beam is scanned. The same principle applies if the emitter is replaced with a detector. The detector's instantaneous field-of-view (IFOV) is scanned just like the beam of the emitter. Likewise, the same principle applies if the emitter or detector is replaced by an optical element that relays light from or to an emitter or detector elsewhere in the system. The relay optic can be any suitable element such as an optical fiber, a flat mirror 45° from the horizontal, a parabolic mirror, or an elliptical mirror.

Figure 2:
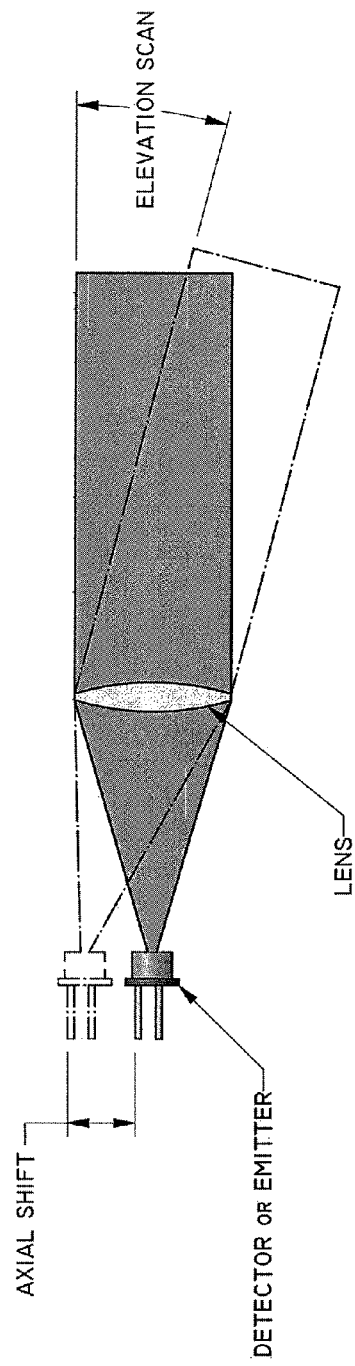
FIG. 2 is a side view of the optical drum scanner illustrating how an axial shift of the detector/emitter up and down results in an elevation scan.

FIG. 2 is a side view of the simple objective scanner illustrating how an axial shift of the detector/emitter up and down results in an elevation scan as the beam elevation angle is scanned up and down.

In another embodiment, the opaque wall section of the drum may be provided with more than one lens. This allows for multiple scans per drum revolution, thereby increasing the efficiency of the system and reducing the rotational speed of the drum for a given azimuth scan rate.

The centers of the lenses may also be axially staggered. In this way, multiple scanlines at different elevations can be drawn per revolution without shifting the position of the emitter and detector. If the lenses are designed to spread out the scanlines so they evenly cover the entire elevation range, the total required travel of the axial translation stage is greatly reduced for a given elevation field-of-view (FOV). Focal plane curvature becomes less of a problem.

FIG. 3 illustrates an embodiment having multiple lenses (8 lenses depicted) with elevation staggering of lens aspects. As the drum unrolls, multiple scanlines can be drawn per revolution having incrementally staggered aspects. By then shifting the position of the emitter and detector up and down within the drum between rotations, evenly spaced lines can be drawn across the entire frame.

In yet another embodiment, two rows of lenses may be used, one for an emitter, the other for a detector. The emitter and detector (or associated relay optics) are axially aligned and translated in lockstep to effect elevation scanning. The elevation offsets of each vertically adjacent pair of lenses is the same. In this way the azimuth and elevation of the emitter and detector optical paths remain identical while the optical paths are scanned across the FOV.

In still another embodiment, a detector and emitter pair (or associated relay optics) may be positioned at the rotational center of the drum. This change eliminates coma introduced during azimuth scanning. It also eliminates concerns about maintaining focus during an azimuth scan. Furthermore, it increases the amount of azimuth scanning per degree of drum rotation.

In a further embodiment, multiple emitters, detectors, or emitter/detector pairs may be used, increasing the azimuthal FOV and increasing the amount of information transmitted and/or collected.

FIGS. 4A, 4B, and 4C show isometric, side, and top views, respectively, of a refractive drum scanner incorporating two lens rows having eight elevation-staggered lenses each. Two emitter/detector pairs are incorporated in the respective drum sections, with the detectors positioned directly above the emitters.

If the emitter overfills the lenses such that at any given point in time the emitted light falls on multiple, horizontally adjacent lenses, additional optical paths are created ("ghost beams"). These ghost beams may be undesirable, as in the case of a LIDAR application, they decrease the efficiency of the rangefinder (since the light emitted in ghost beams amounts to wasted optical power) and result in spurious signal returns. The ghost beam problem is solved by using two emitters for each emitter drum section and changing the elevation staggering of only the emitter lenses.

Figure 5:
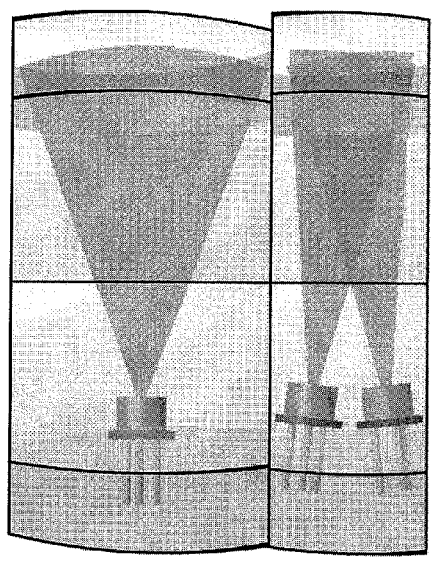
FIG. 5 illustrates the drum scanner with two emitters in one drum section positioned at an angle with respect to one another, with only one being turned on at a time.

FIG. 5 illustrates the drum scanner with two emitters in one drum section positioned at an angle with respect to one another, with only one being turned on at a time.

Figure 6:
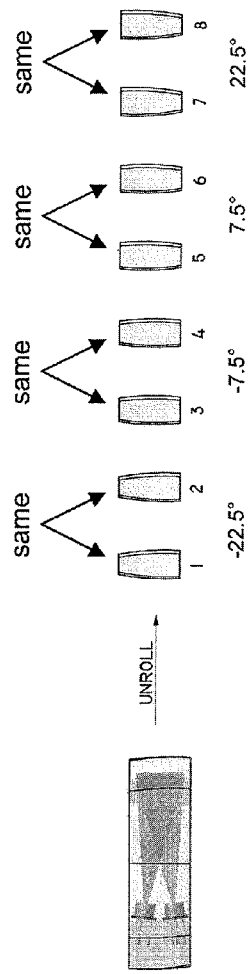
FIG. 6 illustrates elevation staggering of lenses in the emitter drum section having the twin emitter modification.
Figure 6:
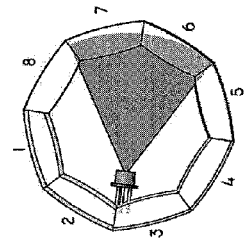

FIG. 6 illustrates elevation staggering of lenses in the emitter drum section having the twin emitter modification. The emitter lenses are staggered such that pairs of adjacent lenses direct the beam at identical elevation angles (see right side of FIG. 6). Ghost beams may still be created with this system, however they will no longer still be positioned at the same elevation angles as the detector FOV.

Figure 7:
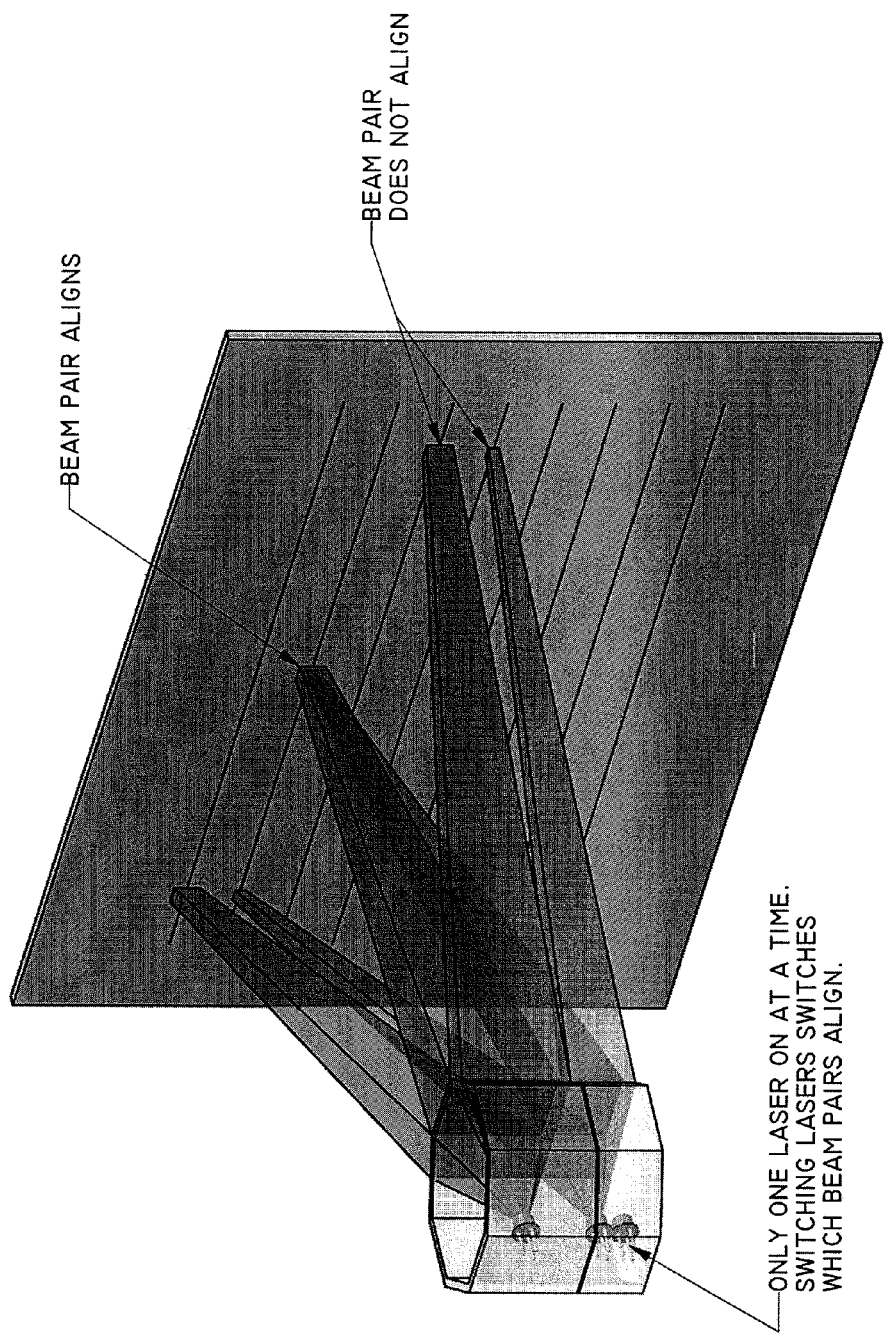
FIG. 7 is a simplified graph image showing the twin-emitter solution to the ghost beam problem.

FIG. 7 is a simplified graph image (not to scale) showing the twin-emitter solution to the ghost beam problem. It shows the scan characteristic of the twin-emitter modification at the point in time at which lens #7 (in FIG. 6) is centered in the emitter's FOV. The emitter beam completely covers lens #7 as well as half of lenses 6 and 8. In the detector drum section, lens #7 is also centered. The detector's FOV is directed by lens #7 at 18.75°. The detector can also see out of part of lenses #6 and #8 at 11.25° and 26.25° respectively (see Table 1 below). Originally, these lenses directed the emitter beam to nominal elevation angles of 11.25°, 18.75°, and 26.25° respectively. With the twin emitter modification in place, the lenses have been adjusted to both point to 7.5°, 22.5°, and 22.5°. Each emitter has been shifted vertically off center and angled by +/−3.75°, so that when only the top emitter is on, emitter beams leave lenses #6, #7, and #8 at angles of 3.75°, 18.75°, and 18.75°. Thus the detector FOV elevation matches the emitter elevation only through lens #7. While there may still be ghost beams, the detector can no longer see them.

TABLE 1

|  | Lens # | | |
| --- | --- | --- | --- |
|  | 6 | 7 | 8 |
| Detector Lens Elevation (°) | 11.25 | 18.75 | 26.25 |
| Emitter Lens Elevation (°) | 7.5 | 22.5 | 22.5 |
| Detector FOV Elevation (°) | 11.25 | 18.75 | 26.25 |
| Laser Beam Elevation (°) | 3.75 | 18.75 | 18.75 |

Manufacturing and Implementation

To practically manufacture the rotating refractive optical scanner, the converging lens elements are implemented as thin clear plastic Fresnel elements adhered to a clear plastic drum blank. The preferred adhesive is Loctite® Hysol® 608 epoxy, which creates a clear, bubble-free bond without damaging the grooves of the Fresnel lens. Any fine scratches resulting from machining of the Fresnel elements or drum blank are filled in by the epoxy and transparency is regained. A rubber-lined fixture is used to gently clamp the parts together while the epoxy is curing. The curing process can be accelerated by placing the assembly in a 60° C. oven for 2 hours.

Manufacturing thin Fresnel elements can be difficult, so it may be necessary to machine the planar side of a molded Fresnel element to reduce its thickness such that it can be bent around the drum blank. In this case a machining pattern is used that minimizes deflection of the as-molded lens, starting in the center of the lens and milling it to final thickness using one and only one spiral pattern. In this way, the end mill is always cutting against thick, relatively rigid material. If a series of shallow spiral cuts is employed instead, the thinned lens will bend out of the way of the cutter during the later passes, and it will end up thicker at its center than at its edges.

In one implementation, a polygonal drum blank is used and Fresnel elements are adhered to the inner and/or outer surfaces. In another implementation, a cylindrical drum blank is used, with thin Fresnel elements bent and adhered to the inner and/or outer surfaces. When a Fresnel lens is bent around the cylindrical drum, its azimuthal focusing properties are distorted. The problem of azimuthal distortion can be solved in two ways. The first solution entails manufacturing an astigmatic flat Fresnel lens which is "pre-distorted" to perform nominally when curved and adhered to the cylindrical drum. The second solution entails replacing the single astigmatic Fresnel elements with a pair of crossed cylindrical Fresnel elements. The elements on the inner surface of the drum focus the light in azimuth, the elements on the outer surface of the drum focus the light in elevation. The prescription of the azimuthal focusing lens is corrected to perform nominally when bent to the inner radius of the drum blank.

In another implementation, a drum blank is used consisting of a cylinder that is machined to correct for azimuthal distortions that occur when an aspherical or spherical Fresnel element that has been designed to be used flat is bent around a curved surface. The shape of the machined blank is calculated by a MATLAB analysis routine that takes the prescriptions of the Fresnel elements to be used, and outputs a corrective profile as a set of 2-dimensional coordinates. These coordinates are stored in an Excel spreadsheet. A 3D part model is then created in Autodesk Inventor, which references the spreadsheet to define points on a spline curve. This spline curve constitutes the outer profile of the drum. The part model is exported to STEP format, which is used by the CNC's software to cut the actual part.

Effecting elevation-staggered lens elements by varying the vertical positions of the lens centers as described above may result in excessive loss when using a Fresnel implementation. A preferred implementation therefore uses Fresnel prisms of different angles to effect different elevation offsets. Another implementation further reduces Fresnel loss by using two concentric cylindrical drum blanks. This provides a total of four surfaces on which Fresnel elements can be adhered.

Figure 8:
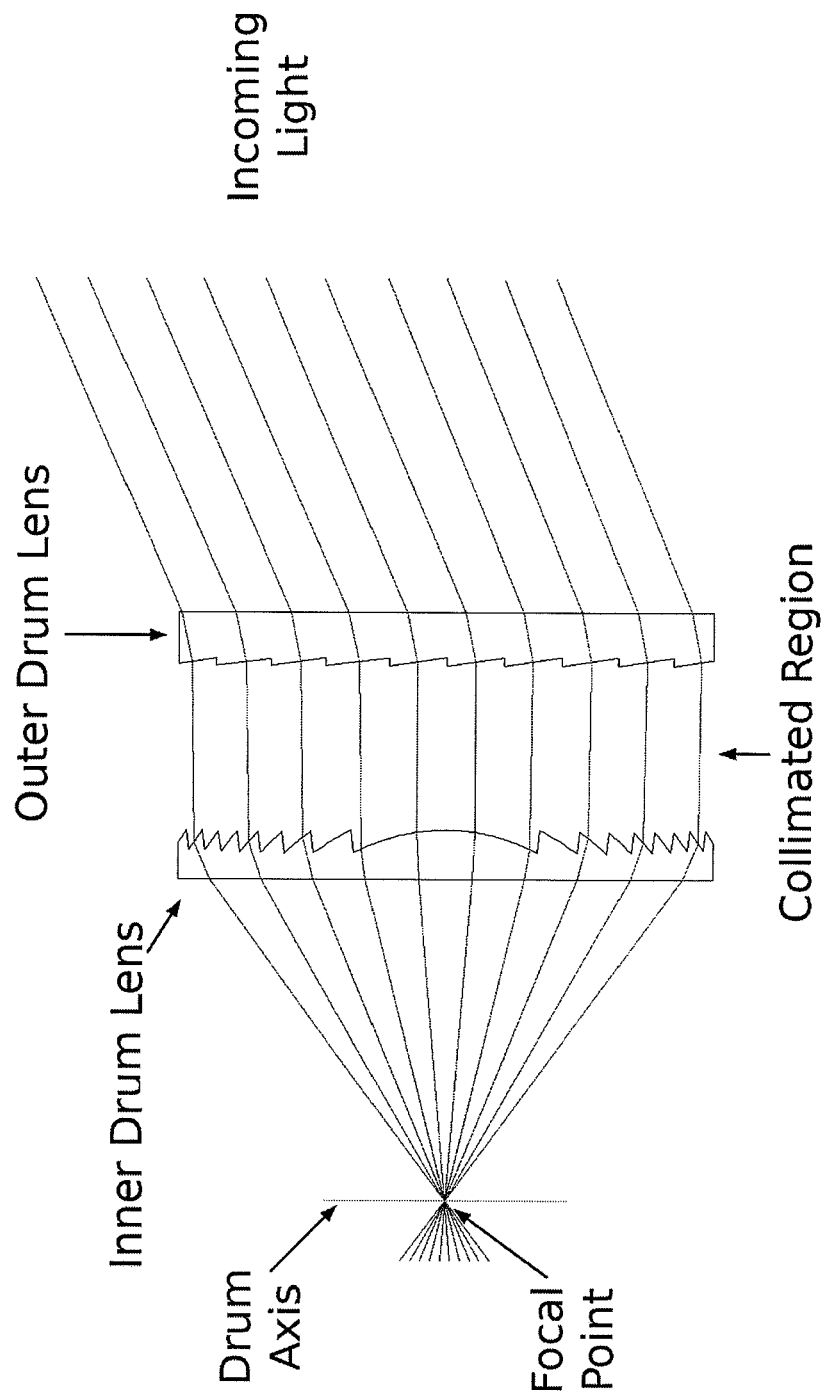
FIG. 8 illustrates concentric drum blanks used to mount inner and outer drum lenses with a collimated light region in between grooved surfaces of paired Fresnel lens elements.

FIG. 8 illustrates concentric drum blanks used to mount inner and outer drum lenses with a collimated light region in between grooved surfaces of paired Fresnel lens elements for optimum transmittance.

In another implementation, holographic optical elements are used instead of Fresnel elements. The holographic element may be printed on a film which is then adhered to a drum blank.

Unlike the prior art, the described invention enables a wide scanning field-of-view (FOV) and large effective aperture while maintaining a physically small package size. The miniature optical drum scanner has applications in, for example, miniature LIDAR systems that require wide field-of-view and large effective aperture. Its particular advantages include:

Incorporation of lenslet staggering and source/receiver motion to effect 2-axis scanning Implementation and manufacturability on a miniature scale Implementation and manufacturability with minimal imbalance and drag (enabling rapid rotation)

Application of scanner to LIDAR and similar devices involving transmit and receive optical paths It is to be understood that many modifications and variations may be devised given the above description of the general principles of the invention. It is intended that all such modifications and variations be considered as within the spirit and scope of this invention, as defined in the following claims.

The invention claimed is:

1. An optical drum scanner for scanning an optical path comprising:
   a drum having an interior defined by a circumferential wall that is rotatable on a drum axis;
   an optical element positioned within the interior of the drum;
   a light-transmissive lens aperture provided at an angular position in the circumferential wall of the drum for scanning a light beam to or from the optical element positioned in the interior of the drum along a beam azimuth angle as the drum is rotated,
   wherein the optical element is axially shifted to define an up and down direction so as to provide an elevation scan as the beam elevation angle is scanned up and down,
   whereby a relatively wide scanning field-of-view (FOV) and a relatively large effective aperture is achievable within a drum of relatively small size.

2. The optical drum scanner according to claim 1, wherein the optical element is a light source or emitter, and the emitted light is collimated as a scanning light beam by the drum lens.

3. The optical drum scanner according to claim 1, wherein the optical element is a light detector, and collimated incident light is focused onto the detector by the drum lens, effecting a scanned instantaneous field of view.

4. The optical drum scanner according to claim 1, wherein the drum wall is provided with multiple lenses in a row at incremental angular positions to allow for multiple scans per drum revolution.

5. The optical drum scanner according to claim 4, wherein respective centers of the lenses are incrementally axially staggered in elevation offset from each other in order to draw multiple scanlines at different elevations per drum revolution without shifting the position of the optical element.

6. The optical drum scanner according to claim 4, wherein said drum has two drum sections axially in parallel with each other, wherein one drum section has an emitter element and the other drum section has a detector element, and the two rows of lenses are axially aligned to effect elevation scanning in lockstep with each other.

7. The optical drum scanner according to claim 6, wherein respective centers of each row of lenses are incrementally axially staggered in elevation offset from each other, and the elevation offsets of each vertically adjacent pair of lenses of the two rows is the same so that azimuth and elevation of emitter and detector optical paths are identical while the optical paths are scanned across the field-of-view (FOV).

8. The optical drum scanner according to claim 4, wherein a detector and emitter pair of elements are positioned at the rotational center of the drum.

9. The optical drum scanner according to claim 6, wherein two emitter elements are provided in the emitter drum section positioned at an angle with respect to one another, with only one being turned on at a time.

10. The optical drum scanner according to claim 9, wherein the emitter lenses are staggered in elevation offsets.

11. The optical drum scanner according to claim 4, wherein the row of lenses are implemented as clear plastic Fresnel lenses adhered to the drum wall.

12. The optical drum scanner according to claim 11, wherein a polygonal drum blank is used and Fresnel lenses are adhered to its inner and/or outer surfaces.

13. The optical drum scanner according to claim 11, wherein a cylindrical drum blank is used and thin Fresnel lenses are bent and adhered to the drum wall.

14. The optical drum scanner according to claim 13, wherein the Fresnel lenses are formed as astigmatic flat Fresnel lenses that are configured to perform without distortion when bent and adhered to the drum wall.

15. The optical drum scanner according to claim 13, wherein the Fresnel lenses are formed as pairs of crossed cylindrical Fresnel elements, wherein Fresnel elements provided on an inner surface of the drum wall focus the light in azimuth, and Fresnel elements provided on an outer surface of the drum wall focus the light in elevation.

16. The optical drum scanner according to claim 13, wherein a drum blank is used consisting of a cylinder that is machined to correct for azimuthal distortions that occur when an aspherical or spherical Fresnel elements are bent around a curved surface.

17. The optical drum scanner according to claim 13, wherein respective centers of the row of lenses are incrementally axially staggered in elevation offset from each other, and Fresnel prisms of different angles are used to effect different elevation offsets.

18. The optical drum scanner according to claim 13, wherein respective centers of the row of lenses are incrementally axially staggered in elevation offset from each other, and the Fresnel lenses are formed as inner and outer Fresnel lens elements adhered to respective inner and outer concentric cylindrical drum blanks.

19. The optical drum scanner according to claim 18, wherein the concentric cylindrical drum blanks used to mount the inner and outer Fresnel lens elements are spaced to provide a collimated light region in between grooved surfaces of paired Fresnel lens elements.

* * * * *